Figure 1:
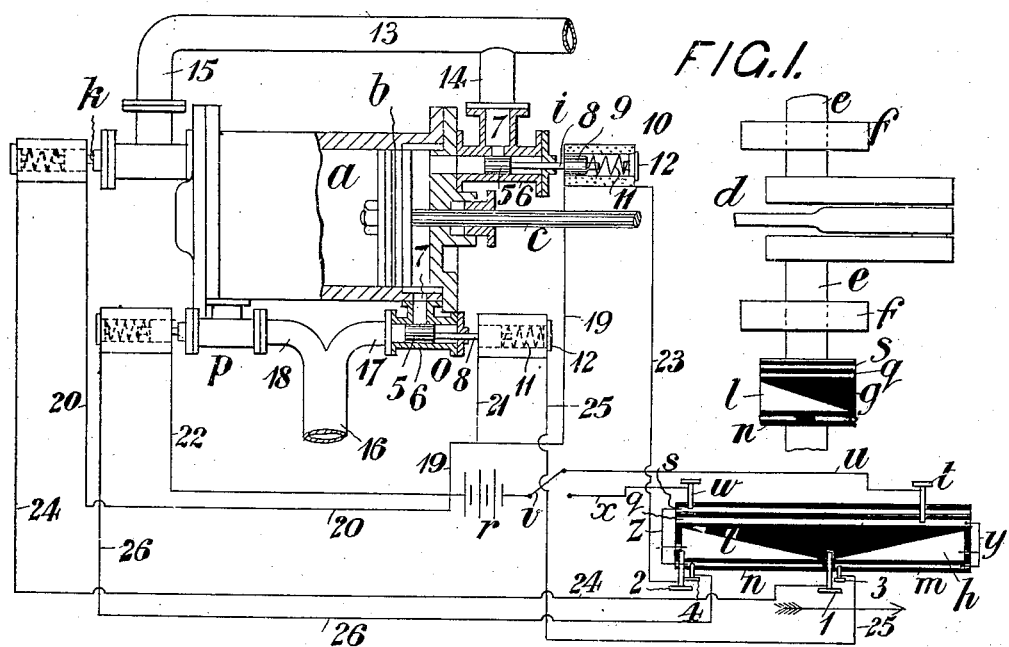

No. 855,892. PATENTED JUNE 4, 1907.
R. KENDAL.
MEANS FOR OPERATING THE VALVES OF MOTIVE POWER ENGINES.
APPLICATION FILED SEPT. 18, 1906.

4 SHEETS—SHEET 1.

Witnesses.
H. L. Amer.
B. Sommers

Inventor.
Ramsey Kendal.
by Henry Orth Jr. atty.

No. 855,892. PATENTED JUNE 4, 1907.
R. KENDAL.
MEANS FOR OPERATING THE VALVES OF MOTIVE POWER ENGINES.
APPLICATION FILED SEPT. 18, 1905.
4 SHEETS—SHEET 2.
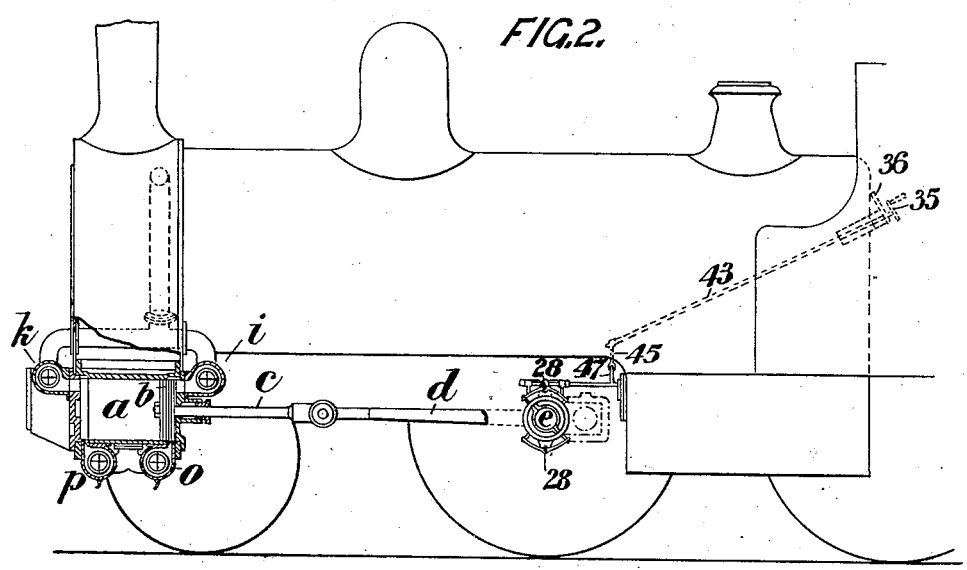
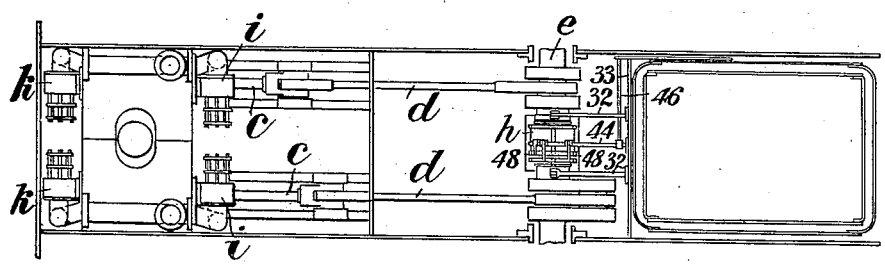
Witnesses.
Inventor.
Ramsey Kendal.
by Henry Ortt
atty No. 855,892. PATENTED JUNE 4, 1907.
R. KENDAL.
MEANS FOR OPERATING THE VALVES OF MOTIVE POWER ENGINES.
APPLICATION FILED SEPT. 18, 1905.
4 SHEETS—SHEET 3.
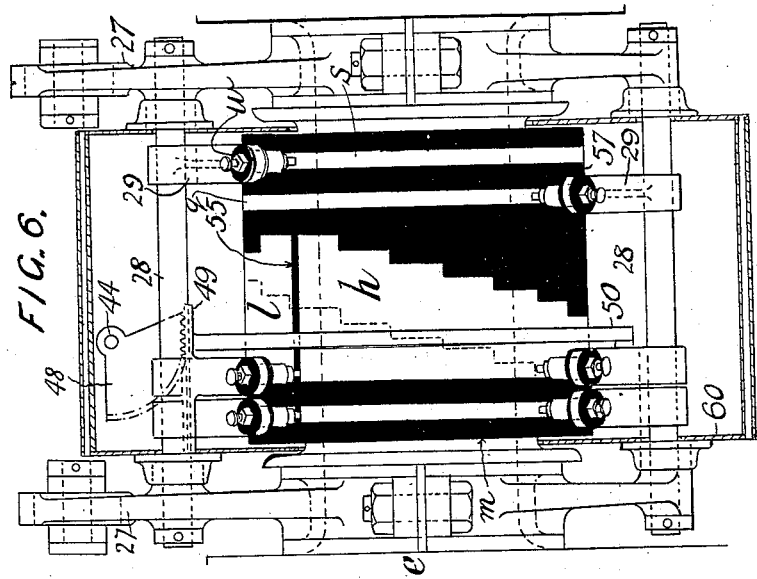
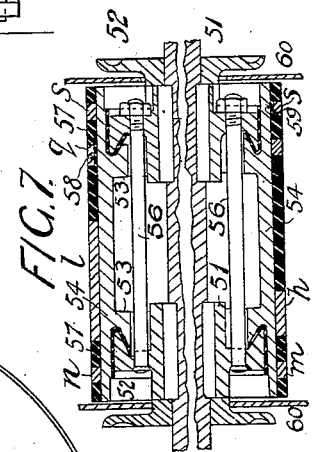
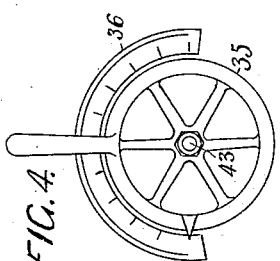
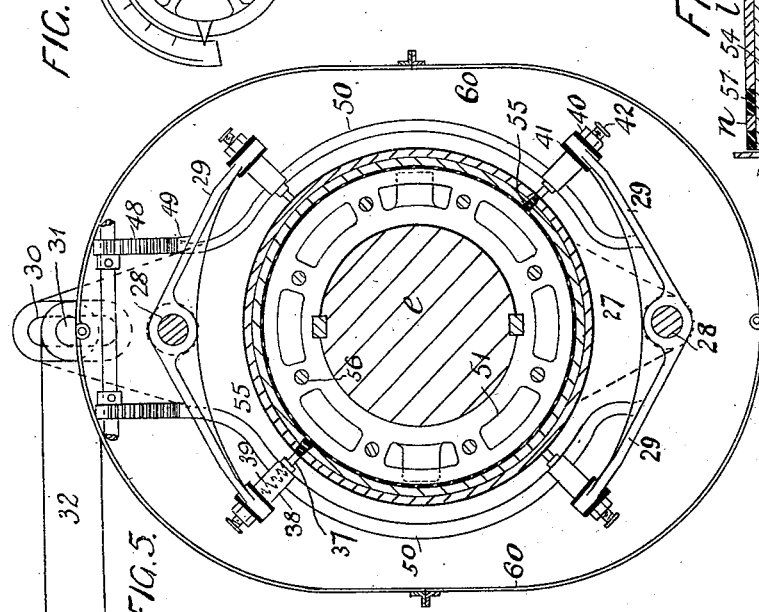
Witnesses.
H. L. Amer.
R. Sommers
Inventor.
Ramsey Kendal.
by Henry Ort, atty.

No. 855,892. PATENTED JUNE 4, 1907.
R. KENDAL.
MEANS FOR OPERATING THE VALVES OF MOTIVE POWER ENGINES.
APPLICATION FILED SEPT. 18, 1905.
4 SHEETS—SHEET 4.
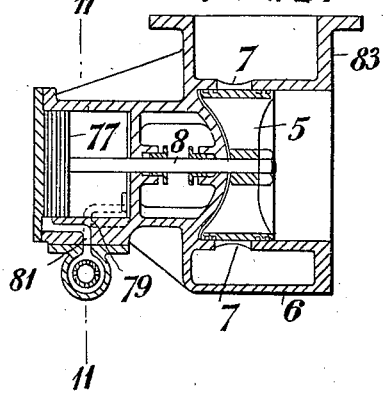
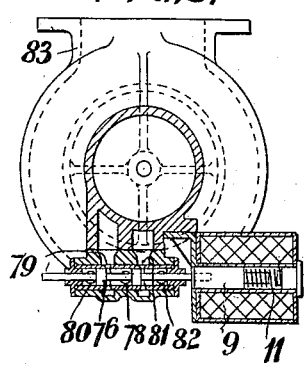
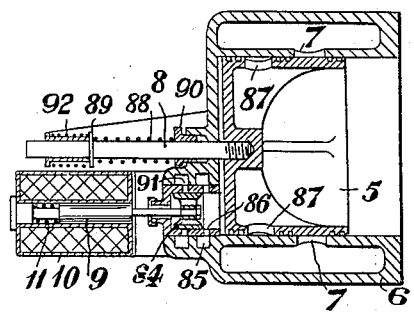
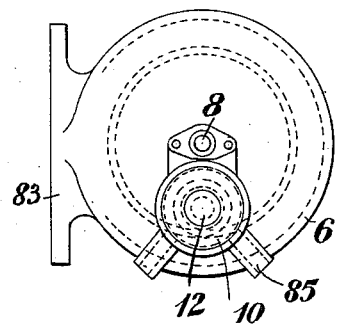
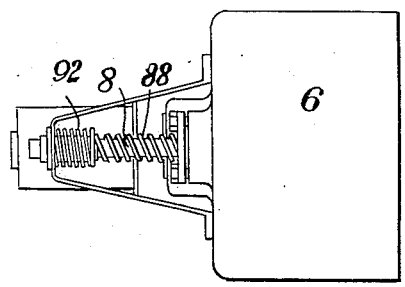
Witnesses.
Inventor.
Ramsey Kendal,
by Henry Orth Jr. atty.

UNITED STATES PATENT OFFICE.

RAMSEY KENDAL, OF DARLINGTON, ENGLAND, ASSIGNOR OF ONE-HALF TO J. STONE AND COMPANY, LIMITED, OF DEPTFORD, ENGLAND.

MEANS FOR OPERATING THE VALVES OF MOTIVE-POWER ENGINES.

No. 855,892.  Specification of Letters Patent.  Patented June 4, 1907.

Application filed September 18, 1905. Serial No. 278,951.

*To all whom it may concern:*

Be it known that I, RAMSEY KENDAL, a subject of the King of Great Britain and Ireland, residing at Rose Villa, Darlington, in the county of Durham, in England, have invented a new and Improved Means for Operating the Valves of Motive-Power Engines, of which the following is a specification.

This invention relates to new and improved means for controlling the electrical operation of valves of motive power engines and has for its object to provide a better construction and operation of such controlling means whereby the action is simpler and more certain than in devices heretofore employed.

In order to enable this invention to be readily understood reference is made to the accompanying drawings in which:—

Figure 1 is a view of a general arrangement of apparatus for electrically controlling the valves of reversible engines, a steam engine being shown as an example. Fig. 2 is a side view of a locomotive having the new or improved valve operating gear applied thereto. Fig. 3 is a plan view of Fig. 2 with the boiler and other parts removed in order to show the cylinders and valve operating gear. Fig. 4 is an elevation of a detail of a locomotive engine. Fig. 5 is a cross section of the commutator employed according to this invention. Fig. 6 is a side elevation and Fig. 7 a central longitudinal section of such a commutator. Fig. 8 is a longitudinal section showing one arrangement of valve operating gear according to this invention and Fig. 9 is a cross section on the line 11—11 of Fig. 8. Fig. 10 is a longitudinal section, Fig. 11 an end view and Fig. 12 a plan of a modified form of valve operating gear.

Referring to Fig. 1, $a$ is the cylinder of a steam engine, $b$ is the piston working therein which by the piston rod $c$ and connecting rod $d$ drives the crank shaft $e$ running in bearings $f$. Upon the shaft $e$ is fixed a revolving contact maker and breaker or commutator $g$, which in this instance takes the form of a sleeve with copper segments or conductors inlaid in its surface. The commutator $g$, Fig. 1, is seen in plan but a developed plan view is also shown in this figure in order that the various circuits can be easily traced. The plate or segment $h$ is of triangular shape and is for controlling the inlet valves $i$ and $k$ for forward running of the engine. The plate or segment $l$ is also triangular but reversely placed with its apex toward the apex of the plate $h$ and is for controlling the inlet valves $i$ and $k$ for rearward running. The conducting strips or plates, $m$, $n$, situated in parallel relation with the plates $h$ and $l$ are for controlling the exhaust valves $o$, $p$, during forward and rearward running respectively. The strip or plate $q$ is for receiving current from any source a battery $r$ is shown, during forward running and the strip or plate $s$ for receiving current during rearward running. The strips $q$ $s$ are conveniently complete rings and a brush $t$ contacts with the ring $q$ and is connected with the battery $r$ by the wire $u$ and the switch $v$, when the latter is closed. A brush $w$ contacts with the ring $s$ and is also connected with the battery $r$ by wire $x$ and switch $v$, when the latter is closed. The conductors $q$, $h$, $m$, are connected electrically by a conductor $y$ and the conductors $s$ $l$ $n$ by conductor $z$. Brushes 1 and 2 are arranged for contacting with the plates or conductors $h$ and $l$ and brushes 3 and 4 for contacting with the strips or conductors $m$, $n$. The inlet valves $i$, $k$, and exhaust valves $o$, $p$, may be all of the same pattern, a simple form shown comprising a piston 5 movable in a casing 6 and adapted to cover and uncover ports 7, the latter being inlet or exhaust as the case may be. The pistons 5 may have passages through them in order that the end pressures may balance. The rods 8 of the piston valves 5 are fixed to the cores 9 of coils 10, the cores 9 being normally kept in the mouths of the coils by means of springs 11 abutting against a stopper 12. Thus if any one of the coils 10 is energized it exerts a pull upon its core 9 which then moves into the coil against the action of its spring 11 and moves its piston 5 so as to uncover the appropriate port 7. The steam pipe 13 is connected to the casings of the valves $i$ and $k$ by branches 14 and 15 respectively and the exhaust pipe 16 to the exhaust valves $o$ and $p$ by branches 17 and 18 respectively. One terminal of the battery $r$ is connected with one end of each of the coils as follows:—by the wire 19 to the coil of the valve $i$; by the wire 20 to the coil of the valve $k$; by the wire 21 to the coil of the valve $o$ and by the wire 22 to the coil of the valve $p$. The coil of $i$ is connected by wire 23 with the brush 2; the coil of $k$ by wire 24 with the brush 1, the coil of $o$ by wire 25 with brush 3 and the coil of $p$ by wire 26 with brush 4. The brush 3 for clearness is shown a little in advance of the brush 1, and the brush 4 in advance of the brush 2, but in practice the brushes 1 and 3 are in line across the commutator, as also are the brushes 2 and 4.

In the position shown in Fig. 1, the commutator is rotating in a clockwise direction, as indicated by the arrow, the plate $h$ is just about to break contact with the brush 1 and the strip $m$ with the brush 3. In the first case the inlet valve $k$ is just about to be released so that it may be closed by its spring 11, by the opening between $h$ and $l$ of the following circuit: plate $h$, conductor $y$, strip $q$, brush $t$ wire $u$, switch $v$, battery $r$, wire 20, coil of $k$, wire 24 and brush 1. In the second case the exhaust valve $o$ is just about to be released, so that it may be closed, by the opening between $m$ and 3 of the following circuit: strip $m$, conductor $y$, ring $q$, brush $t$, wire $u$, switch $v$, battery $r$, wire 21, coil of valve $o$, wire 25 and brush 3. The switch $v$ being in the position shown, the plate $l$ and strip $n$, when they contact with the brushes 1 and 3 respectively, will not produce any effect. The plate $h$ however contacting with 2 will close the circuit as follows: plate $h$, conductor $y$, ring $q$, brush $t$, wire $u$, switch $v$, battery $r$, wire 19, coil of $i$, wire 23 and brush 2. Thus the coil of $i$ will be energized and the inlet port beneath branch 14 will be uncovered for admitting steam to drive back the piston $b$. At the same time the exhaust valve $p$ will be opened by the closing between $m$ and 4 of the following circuit: strip $m$, conductor $y$, ring $q$, brush $t$, wire $u$, switch $v$, battery $r$, wire 22, coil of $p$, wire 26 and brush 4. If the switch $v$ is put in a midway or neutral position all of the valves will be automatically closed by their springs 11 and the engine will stop. If the switch $v$ is put over to close the circuit through wire $x$, the conductors $l$ and $n$ will become electrified and the conductors $h$ and $m$ dead. Admission will thus be changed for exhaust on one side of the piston $b$ and exhaust for admission on the other side of the piston $b$ and the engine will reverse.

The brushes 1 and 2 may be carried in a sliding frame, as hereinafter described, so that the length of time per revolution during which they are in contact with the plates $h$ or $l$ may be varied. When the brushes 1 and 2 contact along a line near to the greater of the perpendicular sides of the triangular plates, $h$ or $l$, steam will be admitted practically during the whole of the stroke but as the brushes are receded more and more from this side, the length of contact will be gradually less and therefore the cut off will be gradually earlier. In the example shown the exhaust strips $m$ and $n$ have parallel sides and are therefore invariable; they moreover extend each over about 180° so that the exhaust valves are open for practically a full stroke.

Figs. 2 and 3 show the invention applied to a locomotive; the similar parts having similar reference letters to those in Fig. 1. On the crank shaft $e$ the various brushes of the commutator $g$ are carried by a frame also seen in Figs. 5 and 6, which frame comprises side members 27 supported upon the crank shaft $e$ and cross members 28, connecting the members 27, which cross members also serve as convenient supports for rocking arms 29 for carrying the brushes. The members 27 have slots 30 for receiving pin connections 31 of tie rods 32, which at their opposite ends are connected to a cross stay 33, thus supporting the framing and preventing it from turning with the shaft $e$. The plates $h$ and $l$, Figs. 5 and 6, instead of having a straight inclined edge, as in Fig. 1, are stepped along their inclined edges, as at 34, in order to give definite gradations of cut off, and for this purpose the hand wheel or lever 35, Figs. 2 and 4, for adjusting the cut off is adapted to move in relation to a graduated scale 36, Fig. 4. The brushes comprise plungers 37 movable in casings 38 against the action of springs 39. Clamping nuts 40 serve to fix the casings 38 in forked ends of the arms 29, from which they are isolated by insulation 41 and clamping screws 42 are provided for connecting the various wires with the various brushes. In Figs. 2 and 4 it is seen that the wheel 35 is fixed to a shaft 43, which, when turned, turns a shaft 44 by means of a crank 45, connecting rod 46, and crank 47. There are toothed sectors 48, Fig. 6, fixed to the shaft 44 and these gear with toothed racks 49 fixed to the arms 29 carrying the brushes 1 and 2, the upper and lower of these arms being connected by a tie piece 50. When the wheel 35 is turned, the toothed sector 48 is also turned and moves the rack 49, moving the brush carrying arms 29 along the member 28 and the brushes 1 and 2 along the commutator $g$ and thus adjusting the point of cut off, as desired.

From Figs. 5, 6 and 7 the details of the commutator are seen. Two iron rings 51 are keyed to the shaft $e$, and, by means of the half dovetail projections 52, engage in similarly recessed flanges 53 upon a brass sleeve 54. Insulation is inserted between the projections 52 and the flanges 53. The sleeve 54 is in two halves which are electrically isolated from one another by insulation strips 55, the rings 51 are drawn together to secure the semi-cylinders 54, 54, by means of bolts or pins 56 shown with rivet heads at one end and with screw threads at the other end to receive nuts. The strips $m\ n$ and the plates or segments $h\ l$ which are fixed to the brass sleeve 54 are insulated from one another along their sides by the insulating layer 57 and at their ends by the insulating strips 55, 55. The rings $q$ $s$ are fixed around the sleeve 54 but the ring $q$, as seen in Fig. 7, is insulated, by an insulating strip 58, from the uppermost half of the sleeve 54, and the ring $s$ is insulated by a similar strip 59 from the lowermost half of the sleeve. Therefore the ring $q$ being in contact with the lowermost half of the sleeve, to which also are fixed the segment $h$ and strip $m$, current will flow through such half sleeve to the segment $h$ and strip $m$ from the ring $q$. Similarly current will flow through the uppermost half of the sleeve 54 from the ring $s$ to the segment $l$ and strip $n$. This gives practically the same connection as seen in Fig. 1 and the circuits are made and broken and controlled for the two cylinders on the locomotive, Figs. 2 and 3, in exactly the same manner as described with reference to the single cylinder seen in Fig. 1. It is however obvious that instead of employing the switch $v$ for directing the current at one time to the ring $q$ and at another time to the ring $s$, this might be effected by connecting the brushes $w$ $t$ to one pole of the battery and by providing a mechanical device for raising the particular arm 29 carrying the brush $w$, so as to remove the latter from the commutator during forward running and for lowering it again and for raising the particular arm 29 carrying the brush $t$ for reversal or rearward running. The commutator $g$ with its arms and accessories may be inclosed in a sheet metal casing 60.

Instead of acting directly upon the valves the core of each solenoid may, as shown in Figs. 10 and 11, actuate a piston slide valve 76 which controls the steam to a small piston 77, the rod of which is also the rod 8 of the piston valve 5, which latter is inlet or exhaust as the case may be. In the position shown, the spring 11 forces out the core 9 and the valve 76 admits steam from the inlet 78, through the port 79, to the right hand side of the piston 77. This being the normal condition the piston 77 is always maintained in the position for closing the valve 5. When however the piston valve 76 is moved to the right hand in Fig. 11 by energizing the solenoid, the port 79 will be open to the exhaust pipe 80 and the port 81 which before was open to the exhaust pipe 82 is now open to the steam inlet 78, thus admitting steam behind the piston 77 which then moves to the right hand Fig. 10 and causes the valve 5 to uncover the port 7 which may be either inlet or exhaust. In these figures the valve casing 6 is shown hollow and there is a ring of ports 7. The connection 83 is most conveniently fixed to the cylinder, so that for exhaust, the spent steam passes from the connection 83, into the hollow casing 6 through the ports 7, and away to the exhaust pipe through the open end of the casing. For admission, the steam is brought to the open end of the casing and passes in the opposite direction to that just described.

In Figs. 12, 13 and 14, the core 9 actuates a piston valve 84 for admitting steam behind the valve 5 which in this case is a piston having no through-way. The core 9 is shown in the position to which it is drawn in by the coil against the action of the spring 11. Steam will now pass from the admission channel 85, through the port 86 to the piston valve 5, driving the latter to the right hand Fig. 12, and bringing a ring of ports 87 into register with the ports 7, thus opening the valve 5. A spring 88 is compressed during the opening of the valve 5 between a collar 89 on the valve rod 8 and the gland 90 therefor. When the coil releases the core 9, the spring 11 acting on the latter will move the piston valve 84 to the right hand to close the inlet ports 86 and open the exhaust ports 91. The spring 88 now closes the valve 5 and any concussion in closing is minimized by the spring 92 which is compressed between the collar 89 and the framing at the end of the inward stroke of the valve 5.

What I claim as my invention, and desire to secure by Letters Patent, is:—

1. A valve gear for motive power engines comprising in combination, a plurality of inlet valves, a plurality of exhaust valves, a plurality of electro-magnets each operatively connected with its respective inlet valve, a plurality of electro-magnets each operatively connected with its respective exhaust valve, a rotary cylinder, a supply contact device, a contact device for controlling the inlet valves, a stepped rear edge on said contact device, a contact device for controlling the exhaust valves, said devices being grouped and connected together on one half of the cylinder, a supply contact device, a contact device for controlling the inlet valves, a stepped rear edge on the last named contact device, a contact device for controlling the exhaust valves, the three last named devices being grouped and connected together on the other half of the said cylinder, sliding contact breakers for engaging the contact devices for the inlet valves, non-sliding contact breakers for engaging the various other contact devices, and means for alternately connecting the said supply devices with a source of electric energy, substantially as and for the purpose set forth.

2. A valve gear for motive power engines, comprising in combination, a plurality of inlet valves, a plurality of exhaust valves, a plurality of electro-magnets each operatively connected with its respective inlet valve, a plurality of electro-magnets each operatively connected with its respective exhaust valve, a rotary cylinder, two semi-cylindrical conductors around said cylinder, insulators between said conductors, a supply contact ring in contact with one of said conductors, a supply contact ring in contact with the other of said conductors, a contact device on one of said conductors for controlling inlet valves, a stepped rear edge on said contact device, a companion contact device for controlling exhaust valves, a contact device on the other of said conductors for controlling inlet valves, a stepped rear edge on the last named contact device, a companion contact device for controlling exhaust valves, sliding circuit breakers for engaging the contact devices for the inlet valves, non-sliding circuit breakers for engaging the various other contact devices, means for alternately connecting the said supply rings with a source of electric energy and means for producing relative movement between said sliding contact devices controlling the inlet valves and their respective circuit breakers, substantially as set forth.

3. A valve gear for motive power engines comprising in combination a plurality of inlet valves, a plurality of exhaust valves, a plurality of electro-magnets each operatively connected with its respective inlet valve, a plurality of electro-magnets each operatively connected with its respective exhaust valve, a rotary cylinder, contact devices on said cylinder for governing the circuits of the first named magnets, a stepped rear edge on said contact devices, contact devices on said cylinder for governing the circuits of the secondly named magnets, circuit breakers engaging the first named contact devices, a toothed gear for producing relative movement between said circuit breaker and said first named device, a shaft for driving said toothed gear, a hand wheel for operating said shaft, a scale for indicating the movement of said handle and graduated in a manner corresponding to said stepped edge, and circuit breakers engaging the secondly named contact devices, substantially as and for the purpose set forth.

In testimony whereof I have signed my name to this specification in the presence of two subscribing witnesses.

RAMSEY KENDAL.

Witnesses:
  HORACE WESTGARTHE WOOLER,
  WILLIAM GUNTER.